UNITED STATES PATENT OFFICE.

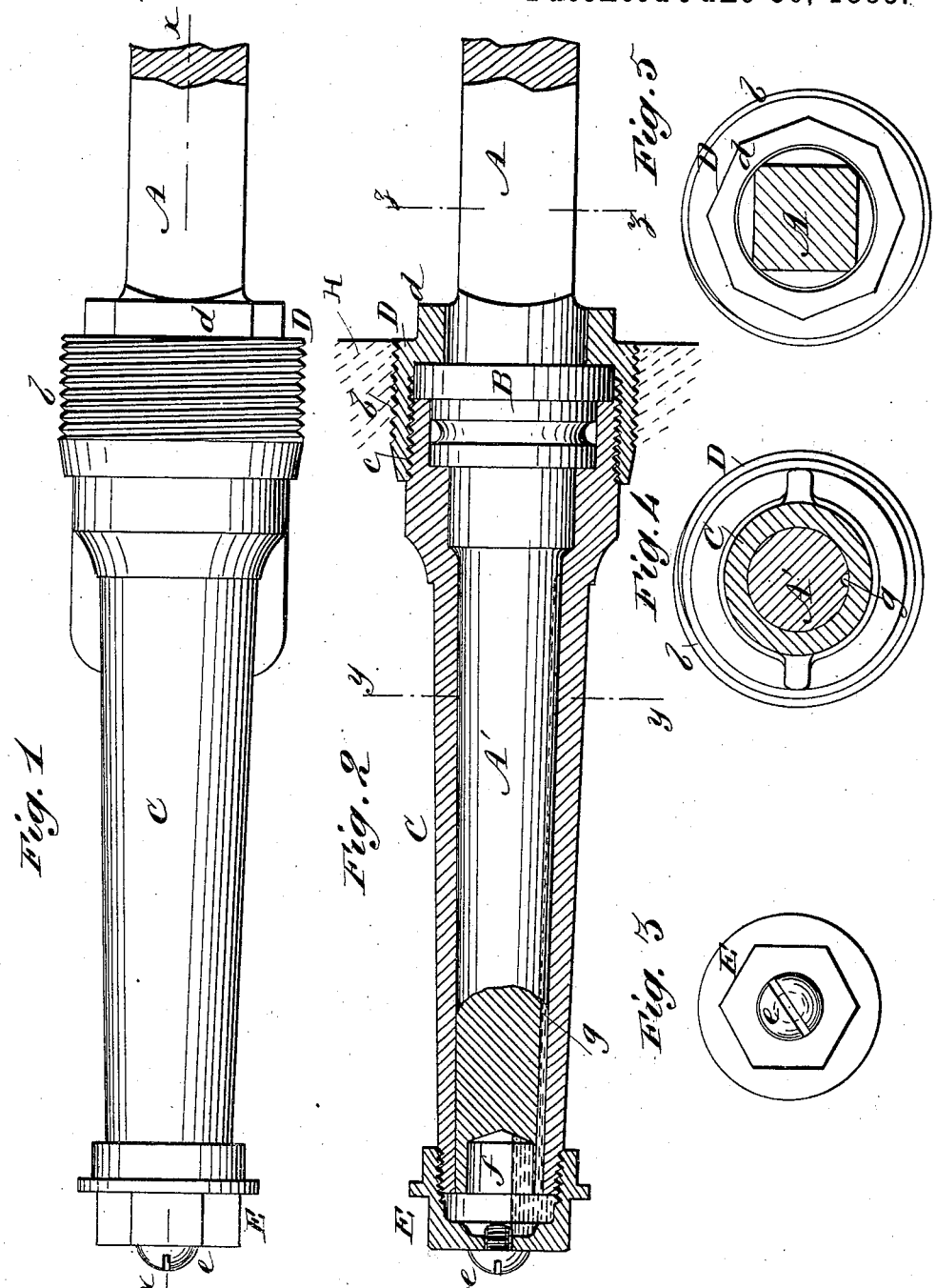

JOSIAH FOWLER, OF ST. JOHN, NEW BRUNSWICK, CANADA.

CARRIAGE AXLE AND BOX.

SPECIFICATION forming part of Letters Patent No. 321,205, dated June 30, 1885.

Application filed January 3, 1885. (No model.)

*To all whom it may concern:*

Be it known that I, JOSIAH FOWLER, of St. John, in the Province of New Brunswick and Dominion of Canada, have invented certain new and useful Improvements in Axles and Axle-Boxes, of which the following is a full, clear, and exact description.

This invention relates to axles and axle-boxes of draft-vehicles; and it consists in a novel construction and combination of parts, substantially as hereinafter described, and whereby not only are durability and an easy running of the wheels secured, but the wheels are made to run noiselessly or free from rattle and shake without the aid of washers of any kind.

Reference is to be had to the accompanying drawings, forming a part of this specification, in which similar letters of reference indicate corresponding parts in all the figures.

Figure 1 represents a longitudinal view of one end of a carriage or wagon axle, with axle-box thereon, embodying my invention. Fig. 2 is a partly-sectional longitudinal view of the same on the line $x$ $x$ in Fig. 1; Fig. 3, an end view of a screw-cap which fits on the outer end of the axle-box, with a screw plug or stopper therein, closing the oiling-orifice. Fig. 4 is a transverse section on the line $y$ $y$ in Fig. 2; and Fig. 5, a transverse section on the line $z$ $z$ in Fig. 2, looking toward the outer end of the axle.

A indicates the axle in part, and A' its one end journal. The bed of the axle at the inner end of the journal is constructed with an enlarged collar, B, of the same diameter, or thereabout, as the inner and larger end of the axle-box C. This collar serves to prevent a back or inner screw-cap, D, which receives said collar within it, from being drawn or worked outward over the axle, and thereby prevents the wheel from coming off, said screw-cap engaging with the hub H of the wheel and with the axle-box, as hereinafter described. Thus the outer end of the axle or journal thereof, as in other arrangements of the kind, has no screw or nut to hold the wheel in place; but instead of such screw and nut the back or inner screw-cap, D, is slipped over the bed of the axle before welding or closing the axle in its center, and said cap D, which is provided with external and internal screw-threads, $b$ $c$, is screwed by its external thread into the hub of the wheel from its inner side, and by its internal thread onto the inner and larger end of the axle-box, that does not come clear through the hub, but leaves sufficient space for the screw-cap D to enter flush into the hub H. This brings the axle-box snug up against one side of the collar B, while the screw-cap D, which enters the hub, as described, is brought close up to the opposite side of the collar, and said collar B forms a bearing on the periphery for the cap D, as it rotates in common with the wheel. By this construction the wheel will run noiselessly and smoothly without the aid of leather or other washers, and free from jar or shake in all directions. A many-sided shoulder, $d$, is formed on the back end of the screw-cap D, where it projects beyond the hub of the wheel, to provide for screwing or unscrewing said cap in putting the wheel on and off the axle.

A cap, E, is screwed onto the outer end of the axle-box. This cap, which is fitted with a central screw plug or stopper, $e$, in its outer face, is constructed to form, in conjunction with a recess, $f$, in the outer end of the axle, a reservoir for oil, which flows along a longitudinal groove, $g$, in the axle to lubricate the journal, the necessary oiling being effected without taking off the wheel.

Having thus described my invention, I claim as new and desire to secure by Letters Patent—

1. In axles and axle-boxes for the wheels of draft-vehicles, the internally and externally screw-threaded cap D, in combination with the axle A, having an enlarged collar, B, at or near the inner end of the journal A', and the axle-box C, having its inner and enlarged end of like diameter, or thereabout, as the collar, and constructed to engage with the interior thread, $c$, of the cap that enters by its exterior screw-thread, $b$, the hub of the wheel, the whole being arranged in relation with each other, and the inner end of the axle-box and the inner back face of the cap having said collar close in between them, whereby the wheel is enabled to run noiselessly without the aid of washers, substantially as specified.

2. The combination of the axle A, with its collar B at or near the inner end of its journal A', and an oil recess or chamber, f, in its outer end, and longitudinal groove g, the axle C, provided with an outer hollow end cap, E, having a screw plug or stopper, e, and the internally and externally threaded screw-cap D, arranged to screw onto the inner end of the axle-box and into the hub of the wheel, and having the collar B within and between it and the inner end of the axle-box, essentially as shown and described.

JOSIAH FOWLER.

Witnesses:
T. E. GRINDON ARMSTRONG,
W. WATSON ALLEN.